(12) United States Patent
Weitzel et al.

(10) Patent No.: US 6,262,167 B1
(45) Date of Patent: Jul. 17, 2001

(54) PROTECTIVE-COLLOID-STABILIZED POLYMER COMPOSITIONS

(75) Inventors: Hans-Peter Weitzel, Reischach; Peter Tschirner, Emmerting; Reiner Figge, Ampfing; Doris Bauer, Muehldorf; Peter Ball, Emmerting, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/371,815

(22) Filed: Aug. 11, 1999

(30) Foreign Application Priority Data

Aug. 20, 1998  (DE) .............................................. 198 37 856

(51) Int. Cl.$^7$ .................................................... C08L 67/00
(52) U.S. Cl. ........................................... 524/513; 524/514
(58) Field of Search ..................... 524/513, 514

(56) References Cited

U.S. PATENT DOCUMENTS

| | | | |
|---|---|---|---|
| 4,698,161 | * 10/1987 | Havisen | 210/701 |
| 5,179,170 | * 1/1993 | Ohtsu | 525/285 |
| 5,281,630 | * 1/1994 | Salsman | 521/48.5 |
| 5,462,978 | 10/1995 | Penzel et al. | . |
| 5,703,158 | * 12/1997 | Duan | 524/840 |
| 5,717,025 | * 2/1998 | Maksymkiw | 524/591 |
| 5,807,919 | * 9/1998 | Duan | 524/501 |
| 5,872,182 | * 2/1999 | Duan | 524/591 |
| 6,031,045 | * 2/2000 | Wei | 524/840 |

FOREIGN PATENT DOCUMENTS

| | | |
|---|---|---|
| 9670406 | 5/1997 | (AU) . |
| 2168157 | 7/1996 | (CA) . |
| 2168826 | 8/1996 | (CA) . |
| 2248594 | 9/1997 | (CA) . |
| 3939918 | 6/1991 | (DE) . |
| 196 08 911 | 9/1997 | (DE) . |
| 281 838 | 9/1988 | (EP) . |
| 629650 | 12/1994 | (EP) . |
| 723 975 | 7/1996 | (EP) . |
| 725092 | 8/1996 | (EP) . |
| 770640 | 5/1997 | (EP) . |
| 0 803 554 | 10/1997 | (EP) . |

OTHER PUBLICATIONS

H.G. Elias, Makromoleküle [Macromolecules], Hüthig 8 Wepf, Basle, 4$^{th}$ Edn., 1981, p. 784 ff.

Fox T.G., Bull. Am. Physics Soc., 7,3, p. 123 (1956).

Derwent Abstract corresponding to DE 3939918 ( AN 1991–172266).

Derwent Abstract corresponding to EP 281838 (AN 1988–258594).

* cited by examiner

*Primary Examiner*—Paul R. Michl
(74) *Attorney, Agent, or Firm*—Burgess, Ryan & Wayne; Milton J. Wayne; William R. Moran

(57) ABSTRACT

The invention relates to protective-colloid-stabilized polymer compositions in the form of their aqueous polymer dispersions or water-redispersible polymer powders, which comprise at least one film-forming base polymer and a protective colloid, wherein the protective colloid is a sulfonated condensation product made from unsaturated di- or polycarboxylic acids and from at least one compound selected from the class encompassing diols, polyols, diamines and polyamines.

18 Claims, No Drawings

PROTECTIVE-COLLOID-STABILIZED POLYMER COMPOSITIONS

BACKGROUND OF THE INVENTION

1) Field of the Invention

This invention relates to protective-colloid-stabilized polymer compositions in the form of their aqueous polymer dispersions or water-redispersible polymer powders comprising a film-forming base polymer and a protective colloid and also to the preparation and use thereof.

2) Background Art

Protective-colloid-stabilized polymers are used especially in the form of their aqueous dispersions or water-redispersible polymer powders in a wide variety of applications for example, as coating agents or adhesives for a very wide variety of substrates. The protective colloids usually used are polyvinyl alcohols (PVA1). To be effective, these protective colloids must have a certain molecular weight. Use is usually made of polyvinyl alcohols with a Hoppler viscosity of at least 4 mPas (4% strength aqueous solution). Polyvinyl alcohols of lower viscosity and, respectively, molecular weight do not give free-flowing powders which have no lumps and are easy to redisperse.

A disadvantage of these protective colloids is that they give relatively high dispersion viscosity and when the powders are prepared, the solids contents of the spraying mixture has to be kept low and this considerably impairs the cost-effectiveness of the process.

For preparing PVA1-containing powders, the solids contents achievable for spraying are generally up to 45% by weight, or in exceptional cases, up to 48% by weight. Solids contents above 50% for spraying cannot be processed (sprayed), due to the viscosity which rises with solids content. The solids content of the dispersion to be sprayed is generally selected so as to give a viscosity of <500 mPas (Brookfield viscosity at 20 revolutions and 23° C.), preferably, <250 mpas. In addition, the high viscosity of the redispersion obtainable with PVA1-containing powders is disadvantageous in many applications.

Although stabilization exclusively with low-molecular-weight compounds (e.g. emulsifiers, sugar derivatives, low-molecular-weight dextrins), in many instances gives low-viscosity dispersions and redispersions, the stabilization is generally insufficient to give powders whose redispersibility and blocking resistance compares favorably with those of protective-colloid-stabilized powders. In addition, the use of emulsifier-stabilized powders in applications with hydraulic binders gives rise to difficulties since cement stability is frequently inadequate.

In particular, when polymers are used in the form of their redispersion powders to improve the properties of mortars, a principal application sector for redispersion powders, the formulations have to remain stable for a certain time and must not change their working consistency significantly (viscosity stability or cement stability), since the user cannot be expected to prepare a new mix when a short period of time has passed.

In the concrete and mortar industry, an important role is also played by mechanical properties, such as compressive strength, porosity and therefore, air-pore content. If too many air pores are present, the compressive strength is severely reduced, and if too few or no air pores are present in the mortar or concrete, the construction material has insufficient freeze-thaw resistance. In addition, the adhesion of the hydraulically setting systems improved by adding the dispersion powder would be still better than that of systems not so improved.

EP-A 723975 (CA-A 2168157) has disclosed water-redispersible dispersion powders based on vinyl acetate-ethylene copolymers stabilized by polyvinyl alcohol. These dispersions have to be diluted to a solid content of 40% by weight before spray drying.

EP-A 770640 (AU-A 9670406) has disclosed water-redispersible dispersion powders with any desired base resin. The protective colloids used as polyelectrolytes have a charge opposite to that of the resin. The dispersion is diluted to 35% by weight solids content prior to spraying.

EP-A 725092 (CA-A 2168826) has disclosed water-redispersible dispersion powders based on styrene-acrylate copolymers. Stabilization is only by emulsifiers and sulfonic-acid-containing comonomers, and no additional protective colloid is used. The dispersion is diluted to 30% by weight solids content prior to spray drying.

EP-A 723975 (CA-A 2168157) has disclosed water-redispersible, crosslinkable dispersion powders based on styrene-acrylate copolymers. Stabilization is by polyvinyl alcohol. The dispersions have high viscosities of up to 8000 mPas at a solids content of 55% by weight and have to be diluted to a solids content of less than 50% by weight prior to spray drying.

EP-A 629650 (U.S. Pat. No. 5,462,978) describes the use of copolymers of ethylenically unsaturated monomers and of sulfonate-functional monomers, in particular acrylamido-methylpropanesulfonic acid, as a spraying aid in the spray-drying of aqueous polymer dispersions.

The object on which the invention is based is therefore to provide redispersible powders, and also dispersions for preparing the powders which avoid the above-mentioned disadvantages of the prior art. This implies a relatively low-viscosity dispersion, if desired also with a solids content of >50% by weight, the powders obtainable from which give a low-viscosity redispersion and are at the same time easily redispersible, free-flowing and blocking-resistant. In particular, for application with hydraulic binders, the products should have fully satisfactory viscosity/cement stability and should not hinder the setting of cement.

SUMMARY OF THE INVENTION

The invention provides protective-colloid-stabilized polymer compositions in the form of their aqueous polymer dispersions or water-redispersible polymer powders, which comprise at least one film-forming base polymer and a protective colloid wherein the protective colloid is a sulfonated condensation product made from unsaturated di- or polycarboxylic acids and from at least one compound selected from the group comprising diols, polyols, diamines and polyamines.

DESCRIPTION OF THE PREFERRED EMBODIMENTS

The protective colloids according to the invention are prepared from unsaturated polyesters or polyamides by adding hydrogensulfite to the double bonds. The synthesis of polycondensates of this type is known to the person skilled in the art and described in detail in the literature (H. G. Elias, Makromolekule (Macromolecules), Huthig & Wepf, Basle, 4th Edn., 1981, pp. 784 ff.). For this, use is generally made of a 1–20% excess of the alcohol component or amine component, or of the carboxylic acid component, depending on whether the product to be obtained is to have terminal alcohol groups, terminal amine groups or terminal carboxyl groups. The weight-average molecular weight (MW) of the as yet unsulfonated starting products is from 500 to 1,000,000, preferably from 1000 to 20,000 (determined by SEC against a polystyrene standard).

The unsaturated polyesters are obtained in a manner known from the literature by esterifying ethylenically unsaturated di- or polycarboxylic acids with saturated diols or polyols. Suitable carboxylic acid components are the ethylenically unsaturated aliphatic or aromatic di- or polycarboxylic acids or their reactive derivatives such as anhydrides, generally having from 4 to 10 carbon atoms and from 2 to 4 carboxylic acid functions or the carboxylic anhydride groups derived therefrom. Use is usually made of saturated dicarboxylic acids. Examples of these are maleic acid, maleic anhydride, fumaric acid, itaconic acid, citraconic acid, mesaconic acid, phthalic acid, phthalic anhydride, isophthalic acid and terephthalic acid. Preference is given to maleic acid, maleic anhydride, fumaric acid and itaconic acid. Maleic anhydride is particularly preferred.

Suitable diol or polyol components are cyclic or open-chain aliphatic polyols having 2 or more OH groups, generally, 2 or 3 OH groups, and preferably having from 2 to 12 carbon atoms. Preference is given to diols, for example, 1,2-ethanediol, 1,2-propanediol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 1,11-undecanediol and 1,12-dodecanediol; di-, tri-, tetra- and pentaethylene glycols; 1,4-bis(hydroxymethyl) cyclohexane, 1,4-cyclohexanediol and 2,2'-dimethylpropanediol (neopentyl glycol). Particular preference is given to 1,2-ethanediol, 1,2-propanediol, 1,3-butanediol, 1,4-butanediol, 1,4-cyclohexanediol and 2,2'-dimethylpropanediol.

The unsaturated polyamides are prepared in a manner known from the literature by reacting ethylenically unsaturated di- or polycarboxylic acids with saturated diamines. The above-mentioned di- or polycarboxylic acids are used. Examples of diamines usually used to prepare the polyamides are hexamethylenediamine, 4,4'-diaminodicyclohexylmethane and trimethylhexamethylenediamine.

The sulfonated polyesters and polyamides are obtained by reacting the unsaturated polyesters and polyamides with sodium pyrosulfite. For the sulfonation, a solution of the polyesters and, respectively, polyamides in a solvent ideally miscible with water, for example acetone, THF, isopropanol, DMSO or chloroform, is mixed under reflux conditions with an aqueous solution of sulfonating agent, for example, alkali metal disulfites such as sodium pyrosulfite, and held under reflux conditions for several hours. The degree of sulfonation of the polyester may be adjusted via the amount of sulfonating agent used by using the appropriate molar amount of disulfite per mole of unsaturated monomer unit. The degree of sulfonation is generally adjusted to 10–100%, preferably, 50–100 mol %, based on the double bonds in the polyester and, respectively, polyamide. The average molecular weight (weight-average molecular weight Mw) is from 500 to 1,000,000, preferably from 1000 to 20,000.

The most preferred protective colloids are the sulfonated polyesters obtainable by polycondensing one or more compounds selected from the class encompassing maleic acid, maleic anhydride and fumaric acid or itaconic acid as the carboxylic acid component with one or more compounds selected from the class encompassing 1,2-ethanediol, 1,2-propanediol, 1,3-butanediol, 1,4-butanediol and 1,4-cyclohexanediol or 2,2'-dimethylpropanediol as the diol component, followed by hydrogensulfite addition to the double bonds. It is preferable for the degree of sulfonation to be from 50 to 100 mol % and the weight-average molecular weight MW to be from 1000 to 20,000.

The proportion of protective colloid in the aqueous polymer dispersion or in the water-redispersible polymer powder composition is generally from 3 to 30% by weight, preferably from 5 to 15% by weight, based on the amount of film-forming base polymer.

Suitable base polymers are polymers of one or more monomers selected from the class consisting of the vinyl esters of unbranched or branched carboxylic acids having from 1 to 12 carbon atoms, the esters of acrylic acid and methacrylic acid with unbranched or branched alcohols having 1 to 12 carbon atoms, vinyl aromatics, vinyl halides, olefins and dienes.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms such as VeoVa9® or VeoVa10® (trade names of Shell). Vinyl acetate is particularly preferred.

Preferred methacrylates or acrylates are methyl acrylate, methyl methacrylate, ethyl acrylate, ethyl methacrylate, propyl acrylate, propyl methacrylate, n-butyl acrylate, n-butyl methacrylate and 2-ethylhexyl acrylate. Particular preference is given to methyl acrylate, methyl methacrylate, n-butyl acrylate and 2-ethylhexyl acrylate.

Preferred vinyl aromatics are styrene, methylstyrene and vinyltoluene. The preferred vinyl halide is vinyl chloride. The preferred olefins are ethylene and propylene, and the preferred dienes are 1,3-butadiene and isoprene.

If desired, from 0.05 to 10% by weight of comonomers, based on the total weight of the monomer mixture, may also be copolymerized. Examples of comonomers are ethylenically unsaturated mono- and dicarboxylic acids, preferably acrylic acid, methacrylic acid, fumaric acid, or maleic acid; ethylenically unsaturated carboxamides and ethylenically unsaturated carbonitriles, preferably acrylamide and acrylonitrile; mono- and diesters of fumaric and maleic acids such as the diethyl and diisopropyl esters, and also maleic anhydride, ethylenically unsaturated sulfonic acids and salts of these, preferably vinylsulfonic acid and 2-acrylamido-2-methylpropanesulfonic acid. Other examples are pre-crosslinking comonomers such as comonomers with more than one ethylenic unsaturation, for example divinyl adipate, diallyl maleate, allyl methacrylate and triallyl cyanurate, and post-crosslinking comonomers such as acrylamidoglycolic acid (AGA), methyl methylacrylamidoglycolate (MAGME), N-methylolacrylamide (NMA), N-methylolmethacrylamide, allyl N-methylolcarbamate, alkyl ethers such as the isobutoxy ether, or esters of N-methylolacrylamide of N-methylolmethacrylamide and of allyl N-methylolcarbamate. Epoxide-functional comonomers such as glycidyl methacrylate and glycidyl acrylate are also suitable. Other examples are silicon-functional comonomers such as acryloxypropyltri(alkoxy)- and methacryloxypropyltri(alkoxy)silanes. Vinyltrialkoxysilanes and vinylmethyldialkoxysilanes. Examples of the alkoxy groups which may be present are ethoxy radicals and ethoxy(propylene glycol) ether radicals. Mention may also be made of monomers with hydroxyl or CO groups, for example, hydroxyalkyl methacrylates and hydroxyalkyl acrylates such as hydroxyethyl, hydroxypropyl and hydroxybutyl acrylates and methacrylates, and also compounds such as diacetoneacrylamide and acetylacetoxyethyl acrylate and methacrylate.

The data in percent by weight always gives 100% by weight in total. Where a film-forming base polymer is mentioned here this means that the selection of monomers or the selection of the proportions by weight of the comonomers is such as generally to give a glass transition temperature Tg of from −50° C. to +50° C., preferably from −30° C. to +40° C. The glass transition temperature Tg of the polymers can be determined in a known manner using differential scanning calorimetry (DSC). The Tg may also be approximated using the Fox equation. According to Fox T. G., Bull. Am. Physics Soc. 1,3, page 123 (1956): $1/Tg = x_1/Tg_1 + x_2/Tg_2 + \ldots + x_n/Tg_n$, where $x_n$ is the proportion by weight (1% by weight/100) of the monomer n and $Tg_n$ is the glass transition temperature in Kelvin of the homopolymer of the monomer n. Tg values for homopolymers are listed in Polymer Handbook $2^{nd}$ Edition, J. Wiley & Sons, New York (1975).

Particularly preferred film-forming base polymers, <–> are listed below: <where appropriate with the proportion of comonomer,>Vinyl acetate polymers, vinyl acetate-ethylene copolymers, vinyl ester-ethylene-vinyl chloride copolymers, vinyl ester-acrylate copolymers, polymers of n-butyl acrylate or 2-ethylhexyl acrylate, copolymers of methyl methacrylate with n-butyl acrylate and/or 2-ethylhexyl acrylate, vinyl acetate-vinyl chloride-ethylene copolymers, vinyl chloride-ethylene copolymers, vinyl chloride-acrylate copolymers, styrene-butadiene copolymers and styrene-acrylate copolymers.

The protective-colloid-stabilized aqueous polymer dispersions and, respectively, water-redispersible polymer powders are prepared by polymerizing the base polymer by emulsion or suspension polymerization followed, if desired, by drying of the aqueous dispersion. Some or all of the sulfonated polyesters and/or polyamides are added to the pulverulent base polymer prior to or during the polymerization or after the polymerization and/or prior to the drying of the aqueous dispersion obtainable in this way, or after the drying of the aqueous dispersion.

The polymerization temperature when preparing the base polymers by emulsion or suspension polymerization is generally from 40 to 100° C., preferably from 60 to 90° C. For copolymerization of gaseous comonomers such as ethylene, 1,3-butadiene or vinyl chloride, pressure may also be used, generally from 5 to 100 bar.

Particular preference is given to emulsion polymerization, with initiation of the polymerization using the initiators or redox-initiator combinations which are usual for emulsion polymerization. Examples of suitable initiators are hydroperoxides such as tert-butyl hydroperoxide, tert-butyl peroxopivalate, cumin hydroperoxide and isopropylbenzene monohydroperoxide, or azo compounds, such as azobisisoazobisisobutyronitrile. Suitable inorganic initiators are the sodium, potassium and ammonium salts of peroxodisulfuric acid. The initiators mentioned are usually used in amounts of from 0.05 to 4% by weight, based on the total weight of the monomers.

The redox initiators used are combinations of the initiators mentioned with reducing agents. Suitable reducing agents are the sulfites and bisulfites of the alkali metals or of ammonium, for example sodium sulfite, the derivatives of sulfoxylic acid such as zinc formaldehyde sulfoxylate or alkali metal formaldehyde sulfoxylates such as sodium hydroxymethanesulfinate, and ascorbic acid. The amount of reducing agent is preferably from 0.01 to 5.0% by weight, based on the total weight of the monomers.

To control molecular weight, regulating substances may be used during the polymerization, usually in amounts of from 0.01 to 5% by weight based on the monomers to be polymerized, and metered in separately or else premixed with reaction components. Examples of substances of this type are n-dodecyl mercaptan, tert-dodecyl mercaptan, mercaptopropionic acid, methyl mercaptopropionate, isopropanol and acetaldehyde.

The polymerization mixture is stabilized using emulsifiers and/or protective colloids. Preference is given to stabilization by emulsifiers in order to obtain a low viscosity of the dispersion. The total amount of emulsifier is preferably from 0.1 to 5% by weight, in particular from 0.5 to 3% by weight, based on the total weight of the comonomers. Suitable emulsifiers are anionic or nonionic emulsifiers such as:

1) Alkyl sulfates, in particular those with a chain length of from 8 to 18 carbon atoms, and alkyl and alkylaryl ether sulfates having from 8 to 18 carbon atoms in the hydrophobic radical and from 1 to 50 ethylene oxide units.
2) Sulfonates, in particular alkylsulfonates having from 8 to 18 carbon atoms, alkylarylsulfonates having from 8 to 18 carbon atoms, and esters and monoesters of sulfosuccinic acid with monohydric alcohols or with alkylphenols having from 4 to 15 carbon atoms in the alkyl radical; if desired these alcohols or alkylphenols may also have been ethoxylated with from 1 to 40 ethylene oxide units.
3) Phosphoric partial esters and the alkali metal and ammonium salts of these, in particular alkyl and alkylaryl phosphates having from 8 to 20 carbon atoms in the organic radical and alkyl ether and alkylaryl ether phosphates having from 8 to 20 carbon atoms in the alkyl and, respectively, alkylaryl radical and from 1 to 50 EO units.
4) Alkyl polyglycol ethers preferably with from 8 to 40 EO units and with alkyl radicals having from 8 to 20 carbon atoms.
5) Alkylaryl polyglycol ethers preferably having from 8 to 40 EO units and from 8 to 20 carbon atoms in the alkyl and aryl radicals.
6) Ethylene oxide-propylene oxide (EO-PO) block copolymers, preferably having from 8 to 40 EO and, respectively, PO units.

The sulfonated polyesters or sulfonated polyamides may, if desired, be used for stabilization as early as during the polymerization. The amounts of protective colloids used here are from 3 to 30% by weight, preferably from 5 to 15% by weight based on the base polymer, and they are added prior to or during the polymerization. If desired, the sulfonated polyesters or sulfonated polyamides may also be used in a mixture with other protective colloids during the polymerizaiton, for example, in a mixture with one or more protective colloids selected from the class encompassing partially hydrolyzed polyvinyl acetates, polyvinylpyrrolidones, carboxymethyl-, methyl-, hydroxyethyl- or hydroxypropylcellulose, starches, proteins, poly(meth)acrylic acid, poly(meth)acrylamide, polyvinylsulfonic acids, melamine formaldehyde sulfonates, naphthalene formaldehyde sulfonates, styrene-maleic acid copolymers and vinyl ether-maleic acid copolymers. The sulfonated polyesters and, respectively, polyamides, are preferably used without adding other protective colloids.

The monomers may be entirely within the initial charge or entirely within the feed or proportions may be in the initial charge and the remainder metered in after initiation of the polymerization. In the preferred procedure from 10 to 25% by weight, based on the total weight of the monomers, is within the initial charge and the remainder is in the feed. The feeds may be separated (spatially and chronologically), or some or all of the components to be metered in may have been pre-emulsified.

The thermal initiator to initiate the polymerization may be entirely within the initial charge, or to some extent, within the initial charge and to some extent within the feed, or entirely within the feed.

Postpolymerizaiton using known methods may be carried out after the polymerization to remove residual monomers, for example, using redox-catalyzed-initiated postpolymerization. Volatile residual monomers may also be removed by distillation, preferably under reduced pressure, and, if desired, by passing inert carrier gases such as air, nitrogen or steam, through or over the mixture.

The aqueous dispersions obtainable from the process have a solids content of from 30 to 75% by weight, preferably 55 to 65% by weight.

To prepare the water-redispersible polymer powders, the aqueous dispersions, if desired, after addition of the sulfonated polyesters and, respectively, polyamides, are dried, for example using fluidized-bed drying, freeze drying or spray drying. The dispersions are preferably spray-dried. The spray drying here takes place in conventional spray-drying systems, with atomization using single-, dual- or multi-fluid nozzles or with a rotating disc. The discharge temperature is generally from 45 to 120° C., preferably from 60 to 90° C., depending on the system, Tg of the resin and desired degree of drying.

The total amount of protective colloid before the drying procedure is to be at least from 3 to 30% by weight, based on the amount of polymer. The amount preferably used is from 5 to 20 by weight, based on the amount of polymer, and it is unimportant whether the protective colloid is added during or after the polymerization. The sulfonated polyesters or polyamides may, if desired, be combined with any other desired conventional protective colloids. Suitable other protective colloids/spraying aids are the protective colloids mentioned above. Preference is given to the use of no other protective colloids as spraying aid alongside the sulfonated polyesters and, respectively, polyamides.

A content of up to 1.5% by weight of antifoam, based on the base polymer, has proven useful in many instances during the spraying. To increase shelf life by improving blocking resistance, in particular in the case of powders with a low glass transition temperature, the powder obtained may be provided with an antiblocking agent (anticaking agent), preferably up to 30% by weight, based on the total weight of polymeric constituents. Examples of antiblocking agents are calcium carbonate, magnesium carbonate, talc, gypsum, silica, kaolins and silicates with particle sizes preferably in the range from 10 nm to 10 $\mu$m.

The viscosity of the dispersion to be sprayed is adjusted via the solids content to give a value of <500 mPas (Brookfield viscosity at 20 rotations and 23° C.), preferably, <250 mpas. The solids content is from 50 to 65%, preferably from 55 to 65%.

To improve usage properties, other additives may be used during the spraying. Examples of other constituents present in preferred embodiments of dispersion powder compositions are pigments, fillers, foam stabilizers and hydrophobicizing agents.

The protective-colloid-stabilized polymer compositions may be used in the form of their aqueous polymer dispersions or water-redispersible polymer powders in the application sectors typical for these, for example in construction chemistry products in combination with hydraulically setting binders, for example cements (Portland, alumina, pozzolanic, slag, magnesia or phosphate cement), plaster of paris, water glass, and for producing construction adhesives, plasters and renderings, troweling compositions, floor-filling compositions, sealing slurries, jointing mortars and paints, and also as sole binder for coating compositions and adhesives, or as coating composition or binder for textiles or paper.

The examples below serve to describe the invention further:

EXAMPLE 1
Preparation of Polyester PE 1

233.4 g of diethylene glycol were heated to 70° C. in a 1l three-necked flask with stirrer having a precision glass gland and with internal thermometer and reflux condenser. 196.1 g of maleic anhydride (MA) were added over a period of 15 minutes. The exothermic reaction heated the mix, without additional heating, to 120° C. As soon as the temperature had fallen again to 80° C. the mixture was heated to 190° C. over a period of 5 hours. During this time, the water formed in the reaction was distilled off. After four hours, no further significant distillation could be seen. To drive up conversion, water-jet suction was applied for a further hour at 190° C. The final product was a light brownish material, highly viscous at room temperature.

EXAMPLE 2
Preparation of Polyester PE 2

The procedure of Example 1 was followed except that 247.8 g of 1,4-butanediol and 245.1 g of maleic anhydride were used. The final product was milky-white and waxy.

EXAMPLE 3
Preparation of Polyester PE 3

The same procedure was followed as in Example 1 except that 396.6 g of 1,4-bis-hydroxymethylcyclohexane and 245.1 g of maleic anhydride were used. The final product was a glass-clear, colorless polyester which was brittle at room temperature.

EXAMPLE 4
Preparation of Polyester PE 4

The same procedure was followed as in Example 1 except that 325 g of 1,6-hexanediol and 245.1 g of maleic anhydride were used. The final product was milky-white and waxy.

EXAMPLE 5
Preparation of Polyester PE 5

The same procedure was followed as in Example 1 except that 195.5 g of 1,2-ethanediol and 294.1 g of maleic anhydride were used. The final product was a pale yellowish material.

EXAMPLE 6
Preparation of Polyester PE 6

Procedure as in Example 1 except that 309.9 g of 1,4-cyclohexanediol and 245.1 g of maleic anhydride were used. The final product was glass-clear, and brittle at room temperature.

EXAMPLE 7
Preparation of Polyester PE 7

Procedure as in Example 1 except that 267 g of 2,2'-dimethylpropanediol and 245.1 g of maleic anhydride were used. The final product was glass-clear.

EXAMPLE 8
Preparation of Polyester PE 8

Procedure as in Example 1 except that 991 g of 1,4-butanediol and 1132 g of maleic anhydride were used. The final product was milky-white and waxy.

EXAMPLE 9
Preparation of Polyester PE 9

Procedure as in Example 1 except that 1050 g of 1,4-cyclohexanediol and 931.2 g of maleic anhydride were used. The final product was milky-white and waxy.

The data for the unsulfonated polyesters are given in Table 1 below:

TABLE 1

|  | Tg (° C.) | $M_W$ | % C calc | % C foun | % H calc | % H foun |
|---|---|---|---|---|---|---|
| PE 1 | −22 | 6000 | 51.3 | 50.6 | 5.9 | 5.4 |
| PE 2 | −15* | 3000 | 56.1 | 55.8 | 6.5 | 5.9 |
| PE 3 | +9 |  | 64.0 | 63.9 | 7.6 | 7.5 |
| PE 4 | −45 | 7000 | 60.3 | 60.5 | 7.6 | 7.5 |
| PE 5 | +8 |  | 50.4 | 49.5 | 4.9 | 4.5 |
| PE 6 | +48 | 3500 | 60.9 | 60.3 | 6.6 | 6.1 |
| PE 7 | −5 | 4500 | 58.4 | 57.9 | 7.1 | 6.5 |
| PE 8 | −14 | 5100 | 56.1 | 55.9 | 6.5 | 6.3 |
| PE 9 | +48 | 2300 | 60.9 | 61 | 6.6 | 6.8 |

Preparation of the Sulfonated Polyesters

EXAMPLES 10–27

The unsaturated polyesters given in Table 2 were in each case dissolved in boiling isopropanol (20% strength solution). Under gentle reflux conditions a solution of $Na_2S_2O_5$ in water was metered in during 3 hours, followed by a further three hours under reflux. The isopropanol was then distilled off. The degree of sulfonation was controlled via the amount of sulfite used: if one mole of sulfite was used per mole of double bonds a fully sulfonated product was obtained. If, however, only 0.5 mol of sulfite was used per mole of double bonds the product obtained was sulfonated to 50 mol %.

The data on the sulfonated polyesters are given in Table 2 below:

TABLE 2

| No | Polyester | Degree of sulfonatio (mol %) | Solids content (%) | pH | K value | Surface tension (mN/m) 4% | 1% | 0.2% | 0.1% |
|---|---|---|---|---|---|---|---|---|---|
| 10 | PE 1 | 100 | 43.3 | 5.29 | 22 | 64.5 | 68.3 | 70.6 | 72.1 |
| 11 | PE 2 | 100 | 25.3 | 5.52 | 33 | 49.7 | 53.4 | 53.5 | 67.6 |
| 12 | PE 3 | 100 | 30.6 | 6.91 | 9 | 51.9 | 57.5 | 66.8 | 67.0 |
| 13 | PE 4 | 100 | 49.8 | 5.63 | 12 | 57.1 | 60.6 | 66.8 | 68.2 |
| 14 | PE 5 | 100 | 35.6 | 5.35 | 16 | 55.5 | 66.9 | 71.0 | 72.6 |
| 15 | PE 6 | 100 | 47.6 | 5.55 | 14 | 52.3 | 49.4 | 66.5 | 68.5 |
| 16 | PE 7 | 100 | 45.4 | 5.90 | 13 | 46.5 | 52.3 | 57.5 | 61.3 |
| 17 | PE 1 | 50 | 33.7 | 3.28 | 13 | 50.1 | 54.8 | 55.6 | 59.6 |
| 18 | PE 2 | 50 | 25.8 | 5.07 |  | 60.1 | 61.6 | 65.2 | 66.5 |
| 19 | PE 3 | 50 | 47.9 | 5.60 | 10 | 53.6 | 55.2 | 57.5 | 57.7 |
| 20 | PE 4 | 50 | 57.6 | 5.11 | 11 | 49.5 | 51.8 | 53.0 | 53.8 |
| 21 | PE 5 | 50 | 25.6 | 3.90 | 14 | 54.7 | 56.5 | 59.6 | 60.7 |
| 22 | PE 6 | 50 | 36.5 | 4.68 |  | 55.1 | 56.3 | 58.1 | 59.1 |
| 23 | PE 7 | 50 | 32.5 | 5.35 |  | 41.1 | 45.8 | 48.5 | 49.6 |
| 24 | PE 8 | 100 | 22.6 |  | 11 | 52.0 | 54.4 | 56.1 | 57.8 |
| 25 | PE 9 | 100 | 20.0 |  | 10 | 49.6 | 50.7 | 52.9 | 56.1 |
| 26 | PE 8 | 50 | 20.6 |  | 11 | 53.2 | 54.2 | 55.2 | 55.7 |
| 27 | PE 9 | 50 | 20.0 |  | 10 | 52.5 | 55.3 | 55.7 | 56.0 |

EXAMPLE 28
Preparation of a Powder with the Sulfonated Polyester from Example 15

3500 g of an aqueous, emulsifier-stabilized vinyl acetate-ethylene copolymer dispersion (VAc/E dispersion, prepared by conventional emulsion polymerization methods) with a solids content of 61.1%, a viscosity of 174 mpas, a particle size Dw of 450 nm, and a Tg of 0° C., were intimately mixed with 540 g of a 47.6% strength by weight solution of the sulfonated polyester from Example 15 and 300 g of water. The spraying mixture had a solids content of 55.2% and a viscosity of 80 mPas.

The dispersion was sprayed using a dual-fluid nozzle. Air compressed to 4 bar was used for spraying, and the droplets formed were dried concurrently with air heated to 125° C. The resultant dry powder was mixed with 10% of commercially available antiblocking agent (mixture of calcium magnesium carbonate and magnesium hydrosilicate).

EXAMPLE 29
Preparation of a Powder with the Sulfonated Polyester from Example 22

3500 g of an emulsifier-stabilized VAc/E dispersion with a solids content of 61.1%, a viscosity of 174 mpas, a particle size of 450 nm and a Tg of 0° C. were intimately mixed with 585 g of a 36.5% strength by weight solution of the sulfonated polyester from Example 22 and 100 g of water. The spraying mixture had a solids content of 56.2% and a viscosity of 160 mpas. Drying was based on Example 28.

EXAMPLE 30
Preparation of a Powder with the Sulfonated Polyester from Example 25

3500 g of an emulsifier-stabilized VAc/E dispersion with a solids content of 61.1%, a viscosity of 174 mPas, a particle size of 450 nm and a Tg of 0° C. were intimately mixed with 1070 g of a 20% strength by weight solution of the sulfonated polyester from Example 25. The spraying mixture had a solids content of 51.5% and a viscosity of 60 mpas. Drying was based on Example 28.

EXAMPLE 31
Preparation of a Powder with the Sulfonated Polyester from Example 15.

3500 g of an emulsifier-stabilized VAc/E dispersion with a solids content of 61.1%, a viscosity of 174 mPas, a particle size of 450 nm and a Tg of 0° C. were intimately mixed with 450 g of a 47.0% strength by weight solution of the sulfonated polyester from Example 15 and 300 g of water.

The spraying mixture had a solids content of 55.3% and a viscosity of 110 mPas. Drying was based on Example 28.

EXAMPLE 32
Preparation of a Powder with the Sulfonated Polyester from Example 27

3500 g of an emulsifier-stabilized VAc/E dispersion with a solids content of 61.1%, a viscosity of 174 mpas, a particle size of 450 nm and a Tg of 0° C. were intimately mixed with 1070 g of a 20% strength by weight solution of the sulfonated polyester from Example 27. The spraying mixture had a solids content of 51.5% and a viscosity of 53 mpas. Drying was based on Example 28.

EXAMPLE 33
Preparation of a Powder with the Sulfonated Polyester from Example 24

3500 g of an emulsifier-stabilized VAc/E dispersion with a solids content of 61.1%, a viscosity of 174 mPas, a particle size of 450 nm and a Tg of 0° C. were intimately mixed with 950 g of a 22.6% strength by weight solution of the sulfonated polyester from Example 24. The spraying mixture had a solids content of 52.9% and a viscosity of 48 mpas. Drying was based on Example 28.

EXAMPLE 34
Preparation of a Powder with the Sulfonated Polyester from Example 26

3500 g of an emulsifier-stabilized VAc/E dispersion with a solids content of 61.1%, a viscosity of 174 mPas, a particle size of 450 nm and a Tg of 0° C. were intimately mixed with 1040 g of a 20.6% strength by weight solution of the sulfonated polyester from Example 26. The spraying mixture had a solids content of 51.8% and a viscosity of 42 mPas. Drying was based on Example 28.

Comparative Example 1
Preparation of Polyvinyl-Alcohol-Containing Powder 20,000 g of an emulsifier-stabilized VAc/E dispersion with a solids content of 50.2%, a viscosity of 53 mPas, a particle size of 1100 nm and a Tg of −1° C. were intimately mixed with 4760 g of a 21.1% strength by weight solution of a polyvinyl alcohol with a Hoppler viscosity of 4 mPas and a degree of hydrolysis of 88 mol %, and 650 g of water. The spraying mixture had a solids content of 43.4% and a viscosity of 124 mpas. Drying was based on Example 28.

Comparative Example 2
Preparation of a Starch-Containing Powder 3500 g of an emulsifier-stabilized VAc/E dispersion with a solids content of 61.1%, a viscosity of 174 mpas, a particle size of 450 nm and a Tg of 1° C. were intimately mixed with 683 g of a 31.3% strength by weight solution of a starch with a molecular weight of 4500, and 300 g of water. The spraying mixture had a solids content of 52.3% and a viscosity of 53 mPas. Drying was based on Example 28.

Redispersion Performance of the Polymer Films

The dispersions of the examples mentioned (prior to spray-drying) were used to prepare films of 0.2 mm thickness on glass slides and these were dried for 15 minutes at 105° C. To check film redispersibility, a pipette was used to apply one water droplet at room temperature to a homogeneous region of each film to be tested. After this region had been exposed to the water droplet for 60 seconds, it was rubbed with the end of a finger until the film had been removed from this region of the glass slide or the film broken up into pieces or remained intact.

The redispersibility of the polymer films was assessed using the following evaluation scale:

Grade 1: Rubbing lightly immediately redisperses the film, or it redisperses spontaneously;
Grade 2: Rubbing redisperses the film, but some film fragments may be difficult to disperse;
Grade 3: Vigorous rubbing required to redisperse the film, with formation of film fragments;
Grade 4: Even after prolonged vigorous rubbing, the film does not redisperse, but fragments.

Determination of Sedimentation Performance of the Powders (Tube Sedimentation)

To determine sedimentation performance, 50 g of each dispersion powder were redispersed in 50 ml of water, then diluted to 0.5% solids content, and the height of settled solids is measured for 100 ml of this redispersion poured into a graduated tube, settlement being measured after 1 hour.

Determination of Blocking Resistance

To determine blocking resistance, the dispersion powder was placed in an iron pipe with a thread, and then subjected to a load from a metal ram. The application of the load was followed by storage for 16 hours at 50° C. in a drying cabinet. After cooling to room temperature, the powder was removed from the tube and resistance to blocking was determined qualitatively by crushing the powder. Resistance to blocking was classified as follows:
1=very good blocking resistance
2=good blocking resistance
3=satisfactory blocking resistance
4=not resistant to blocking - powder after crushing, no longer free-flowing.

Determination of Air Content in the Mortar

A DIN mortar to DIN 1164 was mixed with the formulation below and with a water-cement factor W/C of 0.45 and a polymer-cement factor P/C of 0.15:

| | |
|---|---|
| PZ-35 F Portland cement | 900 g |
| Standard sand | 2700 g |
| S-860 silicone antifoam (Wacker Chemie) | 7.2 g |
| Dispersion powder | 135 g |
| Water | 405 g |

Air content was determined using DIN 18555 part 2.

Determination of Cement Stability

A cement mix was prepared with the following formulation:

| | |
|---|---|
| Portland cement | 82.5 g |
| Calcite ($CaCO_3$ 10–40 mm) | 75 g |
| Quartz sand (200–500 mm) | 142 g |
| Dispersion powder | 14.5 g |
| Water | 85 g |

The workability of the cement mix was observed over a period of 2 hours and evaluated qualitatively.

Determination of the Tensile Bond Strength of Hydraulically Setting Thin-layer Adhesives (Tile Adhesives)

A cement mix was prepared with the following formulation:

| | |
|---|---|
| PZ 35 F Portland cement | 300 g |
| No. 12 Quartz sand | 150 g |
| F 32 Quartz sand | 465 g |

| | |
|---|---|
| FL 15002 Tylose | 3 g |
| Dispersion powder | 48.3 g |
| Water | 242 g |

Tiles fitted with pull-off clamps were placed in the adhesive to be tested and, after hardening had taken place, pulled away using a draw piston with a pre-selected load-increase rate. The appropriate tensile bond strength was calculated from the ultimate pull force and the area of the ram used in the test. The tests were held under the following conditions:

A) 28 days under standard temperature and humidity conditions (23° C. and 50% r.h.)
B) 7 days under standard temperature and humidity conditions+21 days water (20° C.)
C) 14 days under standard temperature and humidity conditions+14 days drying cabinet (70° C.)+1 day under standard temperature and humidity conditions
D) 7 days under standard temperature and humidity conditions+21 days water (20° C.)+25 days alternating freeze and thaw (held at least −15° C. for freezing and held in water at about 12° C.)

The test results are given in Tables 3 and 4.

Using the sulfonated polyesters the percentage strengths which can be sprayed are significantly higher, since the viscosity of the dispersion is relatively low. This is unsuccessful with PVA1-containing systems due to their high viscosity. Although the use of starch as protective colloid gives low-viscosity dispersions, the powders do not redisperse as well as desired and are very susceptible to blocking and are also not cement-stable. In contrast, compositions with the sulfonated polyesters give powders which redisperse well, and are blocking-resistant and cement-stable. The results of the tensile bond strength tests (Table 4) show that, when comparison is made with Comparative Examples 1 and 2, tensile bond strength is significantly increased by adding the novel dispersion powder from Examples 28 to 34.

TABLE 3

| Example | Solids Content (%) | Viscosity (mPas) | Film redispersiblity | Tube sedimentation 1 h (cm) | Blocking resistance | Mortar ai content | Cement stability |
|---|---|---|---|---|---|---|---|
| Ex. 28 | 55.2 | 80 | Grade 1 | 0.1 | 2 | 5% | 2 h |
| Ex. 29 | 56.2 | 160 | Grade 1 | 0.1 | 2 | 4% | 2 h |
| Ex. 30 | 51.5 | 60 | Grade 1 | 0.2 | 2 | 5% | 2 h |
| Ex. 31 | 55.3 | 110 | Grade 1 | 0.3 | 2 | 5% | 2 h |
| Ex. 32 | 51.5 | 53 | Grade 1 | 0.1 | 2 | 4% | 2 h |
| Ex. 33 | 52.9 | 48 | Grade 1 | 0.2 | 2 | 5% | 2 h |
| Ex. 34 | 51.8 | 42 | Grade 1 | 0.1 | 2 | 5% | 2 h |
| Comp. Ex. | 43.4 | 124 | Grade 1 | 0.4 | 2 | 4% | 2 h |
| Comp. Ex. | 52.3 | 53 | Grade 2 | 0.1 | 4 | 9% | 15 min |

TABLE 4

(Tensile bond strengths in N/mm² after holding under A-D):

| Example | A | B | C | D |
|---|---|---|---|---|
| Ex. 28 | 1.45 ± 0.08 | 0.88 ± 0.08 | 1.33 ± 0.15 | 0.89 ± 0.05 |
| Ex. 29 | 1.32 ± 0.05 | 0.63 ± 0.02 | 1.26 ± 0.09 | 0.73 ± 0.05 |
| Ex. 30 | 1.47 ± 0.06 | 0.73 ± 0.05 | 1.41 ± 0.10 | 0.82 ± 0.06 |
| Ex. 31 | 1.32 ± 0.09 | 0.81 ± 0.08 | 1.31 ± 0.14 | 0.89 ± 0.03 |
| Ex. 32 | 1.19 ± 0.08 | 0.71 ± 0.07 | 1.00 ± 0.12 | 0.69 ± 0.07 |
| Ex. 33 | 1.45 ± 0.07 | 0.90 ± 0.08 | 1.29 ± 0.08 | 0.90 ± 0.05 |
| Ex. 34 | 1.31 ± 0.06 | 0.79 ± 0.09 | 1.19 ± 0.15 | 0.85 ± 0.05 |
| Comp. Ex. 1 | 1.08 ± 0.10 | 0.60 ± 0.06 | 0.78 ± 0.06 | 0.56 ± 0.05 |
| Comp. Ex. 2 | 1.06 ± 0.03 | 0.47 ± 0.06 | 0.27 ± 0.06 | 0.61 ± 0.02 |

What is claimed is:

1. A protective-colloid-stabilized polymer composition in the form of its aqueous polymer dispersion or water-redispersible polymer powder, which consists essentially of at least one film-forming base polymer which is an addition polymer of one or more monomers selected from the group consisting of the vinyl esters of unbranched or branched carboxylic acids having from 1 to 12 carbon atoms, the esters of acrylic acid and methacrylic acid with unbranched or branched alcohols having from 1 to 12 carbon atoms, vinyl aromatics, vinyl halides, olefins and dienes, and a protective colloid, wherein the protective colloid is a sulfonated condensation product selected from the group consisting of (a) sulfonated polyesters of ethylenically unsaturated di- or polycarboxylic acids and saturated diol or polyols, and (b) sulfonated polyamides of ethylenically unsaturated di- or polycarboxylic acids and saturated diamines or polyamines.

2. A protective-colloid-stabilized polymer composition as claimed in claim 1, wherein the protective colloid is a sulfonated condensation product made from ethylenically unsaturated, aliphatic or aromatic di- or polycarboxylic acids having from 4 to 10 carbon atoms and from 2 to 4 carboxylic acid functions, or from carboxylic anhydride groups derived therefrom, with a cyclic or open-chain aliphatic polyol having 2 or 3 OH groups.

3. A protective-colloid-stabilized polymer composition as claimed in claim 1, wherein the degree of sulfonation is from 10 to 100 mol % and the weight-average molecular weight MW is from 500 to 1,000,000.

4. A protective-colloid-stabilized polymer composition as claimed in claim 1, wherein sulfonated polyesters are present which are obtainable by polycondensing one or more compounds selected from the group consisting of maleic acid, maleic anhydride, fumaric acid and itaconic acid with one or more compounds selected from the group consisting of 1,2-ethanediol, 1,2-propanediol, 1,3-butanediol, 1,4-butanediol, 1,4-cyclohexanediol and 2,2'-dimethylpropanediol, followed by hydrogensulfite addition, with a degree of sulfonation of from 50 to 100 mol %, and with a weight-average molecular weight MW of from 1000 to 20,000.

5. The polymer composition of claim 1 in the form of a spray-dryable aqueous polymer dispersion having a solids content of at least about 50 per cent by weight.

6. A protective-colloid-stabilized polymer composition as claimed in claim 1, wherein a film-forming base polymer is present which is a polymer selected from the group consisting of vinyl acetate polymers, vinyl acetate-ethylene copolymers, vinyl ester-ethylene-vinyl acetate-ethylene copolymers, vinyl ester-ethylene-vinyl chloride copolymers, vinyl ester-acrylate copolymers, polymers of n-butyl acrylate or 2-ethylhexyl acrylate, copolymers of methyl methacrylate with n-butyl acrylate and/or 2-ethylhexyl acrylate, vinyl acetate-vinyl chloride-ethylene copolymers, vinyl chloride-ethylene copolymers, vinyl chloride-acrylate copolymers, styrene-butadiene copolymers and styrene-acrylate copolymers.

7. A process for preparing a protective-colloid-stabilized polymer composition as claimed in claim 1, by polymerizing the base polymer by emulsion or suspension polymerization optionally followed by drying of the aqueous dispersion, where at least some of the sulfonated polyesters and/or polyamides are added to the pulverulent base polymer prior to or during the polymerization or after the polymerization and/or prior to the drying of the aqueous dispersion obtainable in this way, or after the drying of the aqueous dispersion.

8. A construction product containing a binder formulation wherein the binder formulation comprises the protective-colloid-stabilized polymer composition of claim 1.

9. The construction product of claim 8 which is a plaster.

10. The construction product of claim 8 which is a traveling composition.

11. The construction product of claim 8 which is a floor-filling composition.

12. The construction product of claim 8 which is a sealing slurry.

13. The construction product of claim 8 which is a jointing mortar.

14. A coating composition containing as the sole binder, the protective-colloid-stabilized polymer composition of claim 1.

15. The coating composition of claim 14 which is a textile coating composition.

16. The coating composition of claim 14 which is a paper coating composition.

17. The coating composition of claim 14 which is an adhesive.

18. A paint composition containing a binder formulation wherein the binder formulation comprises the protective-colloid-stabilized polymer composition of claim 1.

* * * * *